Feb. 18, 1930.  R. V. LOBDELL  1,747,477
EXTERIOR HUMIDIFYING AND WARMING VENTILATOR FOR INCUBATORS
Filed Sept. 14, 1928
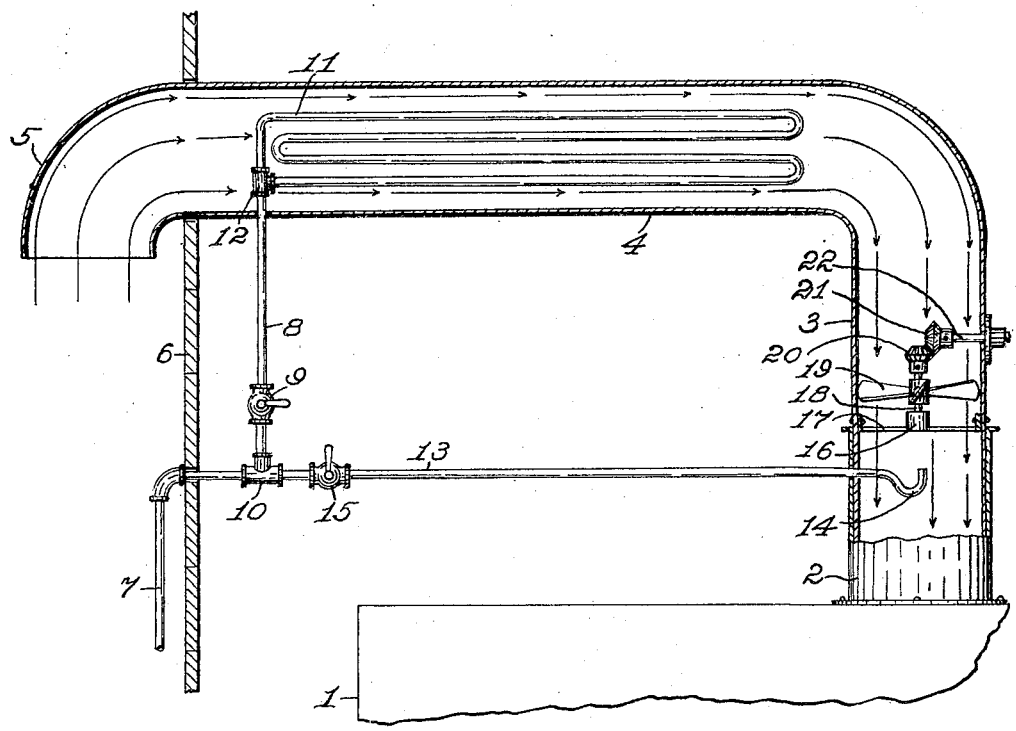
Inventor
Ralph V. Lobdell,
By G. C. Kennedy
Attorney Patented Feb. 18, 1930

1,747,477

UNITED STATES PATENT OFFICE

RALPH V. LOBDELL, OF CASTLE HILL, IOWA

EXTERIOR HUMIDIFYING AND WARMING VENTILATOR FOR INCUBATORS

Application filed September 14, 1928. Serial No. 306,074.

My invention relates to combined aerifying, warming and humidifying means for incubators or the like, and the object of my improvements is to supply an exterior device therefor, which is adapted for interchangeable use with any incubator or the like which has no special means for the above purposes, and which besides being of simple and inexpensive construction, is very accessible at all times without opening the incubator for the purposes of inspection or repair, and suitable for location of the incubator in a desired installation where pure air may be supplied to it conveniently.

I have accomplished the above purposes by the means which are hereinafter described and claimed, and which are illustrated in the accompanying diagrammatic drawing, which is a longitudinal medial section of the device as combined with an incubator, the main body of the latter being broken away.

My invention is not restricted to the precise construction and arrangement of parts herein shown and described, nor to the various details thereof, as the same may be modified or rearranged in various particulars without departing from the spirit and scope of my invention, one practical embodiment of which has been herein illustrated and described without attempting to show all of the various forms in which my invention might be embodied.

In said drawing, the numeral 1 denotes a portion of the top and end of an incubator, brooder or other device having on the top an upwardly projected hollow cylindrical sleeve 2 secured thereon to fit and receive the lower end part of an air conduit 3 also directed upwardly, and which at a distance above the incubator is bent horizontally beyond the incubator at 4 and has a short downwardly curved intake termination 5 open to the atmosphere, preferably on an outer side of a wall structure 6 apertured to receive the part 4, and communicating with the exterior atmosphere about a building in which the apparatus is located. It will be understood that the incubator structure interiorly may be of any well-known or suitable type having interior air passages or chambers and air-vents for discharging foul air in the circulation of air in the incubator.

I have provided means for propelling fresh air through the said conduit and into the air passages of the incubator 1, consisting of a rotatable fan-wheel 19 whose shaft 18 is stepped in a step-bearing 16 medially secured on a supporting cross-bar 17 which is end secured to the inner wall of the conduit part 3. This fan may be rotated at a desired rate of speed by any convenient prime motor, but for illustration thereof only I have shown on the upper end of the shaft 18 a bevel-gear 20 meshed with a bevel-pinion 21 on a shaft 22 which traverses an apertured bearing secured to the conduit wall alined with an aperture in the latter, and the prime motor may thus be operatively connected with the shaft 22 without the conduit for convenient inspection. The prime motor, of course, may be an electric motor positioned within the conduit and driving the shaft 18 by direct or indirect connections thereto. The suction induced by said fan draws fresh air through the conduit and supplies it to the incubator 1, as indicated by the arrows.

In order to warm the air traversing the conduit, I supply a steam-heating coil 11 within the horizontal part 4 of the conduit, said coil being a loop with T-coupling connection 12 to the main line steam-pipe 8 which has an adjustable valvular chamber 9 in communication with the supply pipe 7, by means of a T-coupling 10. A steam-pipe 13 leads from said coupling 10 through an aperture in the conduit part 3, and has an open end downwardly curved and trapped termination 14 which delivers steam upwardly centrally within the conduit into the downward part of the fresh air moving downwardly from said fan. The trap 14 serves to hold the small quantity of water of condensation which may collect there.

The steam-pipe section 13 includes an adjustable valvular device 15 for adjustment of the amount of steam delivered to the conduit for properly humidifying the air passing therethrough.

It will be seen that this device is readily mounted or demounted on any incubator, and by its use the interior of the latter may be adjustingly aerated, humidified and warmed simultaneously, or independently as desired.

Having described my invention, what I claim as new, and desire to secure by Letters Patent, is:

1. The combination with a hollow structure to be ventilated and having an intake port, of an open end conduit exterior thereto in communication with said intake port, a pipe loop mounted within said conduit and in communication with a supply of heated fluid under pressure without the conduit, means within the conduit for propelling air therethrough from its outer receiving end to said intake port, and means in communication with said conduit and also with said supply of heated fluid and beyond said air propelling means adapted to deliver water vapor into the conduit and into the air being propelled therethrough.

2. The combination with a hollow structure to be ventilated, said structure having an intake port, of an open end conduit exterior thereto in communication with said intake port, means for propelling air through the conduit to said intake port, and a valved-controlled steam-pipe leading into said conduit between said air-propelling means and the intake port having an open and trapped termination within the conduit to deliver steam into the opposing air current to humidify it before entering the intake port.

3. The combination with a hollow structure to be ventilated, said structure having an intake port, of an open end conduit exterior thereto in communication with said intake port, a looped steam-pipe traversing a part of said conduit and having an adjustable regulating valve without the conduit, an air-fan-wheel in said conduit rotatable to create a fresh air current therethrough from the outer open end of the conduit to said intake port, and a valve controlled pipe leading from said steam pipe into communication with said conduit between said fan-wheel and said intake port to humidify adjustingly the air passing into the intake port.

In testimony whereof I affix my signature.

RALPH V. LOBDELL.